United States Patent [19] | [11] Patent Number: 5,049,721
Parnas et al. | [45] Date of Patent: Sep. 17, 1991

[54] LASER MARKING APPARATUS AND METHOD FOR PROVIDING MARKINGS OF ENHANCED READABILITY IN AN OUTER JACKET OF A MOVING CABLE

[75] Inventors: Stanley J. Parnas, Yorba Linda; Leroy V. Sutter, Jr., Irvine; Randy C. Horne, Costa Mesa, all of Calif.; Robert A. Wessels, Jr., Chamblee, Ga.; Celestino Rey, Atlanta, Ga.; Jack E. Andrews, Stone Mountain, Ga.

[73] Assignees: American Telephone and Telegraph Company, New York, N.Y.; Directed Energy, Inc., Irvine, Calif.

[21] Appl. No.: 541,190

[22] Filed: Jun. 20, 1990

Related U.S. Application Data

[63] Continuation of Ser. No. 408,818, Sep. 18, 1989, abandoned.

[51] Int. Cl.$^5$ ............ B23K 26/00

[52] U.S. Cl. ............ 219/121.68; 174/112; 219/121.69

[58] Field of Search ............ 219/121.68, 121.69, 219/121.6, 121.85; 174/112; 427/53.1

[56] References Cited

U.S. PATENT DOCUMENTS

| | | | |
|---|---|---|---|
| 1,607,432 | 11/1926 | Bryce | 174/112 |
| 2,745,436 | 5/1956 | Battle et al. | 138/47 |
| 2,867,001 | 1/1959 | Lewis et al. | 174/112 |
| 3,076,235 | 2/1963 | Rollins et al. | 174/112 X |
| 3,193,614 | 7/1965 | Richards | 174/112 |
| 3,229,623 | 1/1966 | Rubenstein et al. | 101/32 |
| 4,028,523 | 6/1977 | Anderl et al. | 219/121.85 X |
| 4,370,542 | 1/1983 | Mills et al. | 219/121.69 X |
| 4,816,374 | 3/1989 | Lecomte | 346/135.1 X |
| 4,854,147 | 8/1989 | Buckwitz et al. | 72/7 |

FOREIGN PATENT DOCUMENTS

| | | | |
|---|---|---|---|
| 2260109 | 6/1973 | Fed. Rep. of Germany . | |
| 2261696 | 9/1977 | Fed. Rep. of Germany . | |
| 0980221 | 1/1965 | United Kingdom | 174/112 |

*Primary Examiner*—C. L. Albritton
*Attorney, Agent, or Firm*—W. Edward Johansen; Edward W. Somers

[57] ABSTRACT

A laser marking apparatus provides markings of enhanced readability in an outer jacket of repetitively spaced sections along the length of a moving cable which is delivered from a supply source. The cable is advanced under tension and is wound onto a take-up spool. The outer jacket is of a specified color and has an outer surface. The laser marking apparatus includes a first guide roller, a laser marker, an applicator, a coarse brush roller with a first driving mechanism, a fine brush roller with a second driving mechanism and a second guide roller. The first and second guide rollers are disposed adjacent to the supply source before the laser marker and before the take-up spool after the fine brush roller, respectively, in order to guide the cable along a path of travel so that the outer jacket passes adjacent to the laser marker. The laser marker inscribes in the outer jacket markings opening to the outer surface thereof. The applicator applies a wax, the color of which is different from and contrasts with the specified color of the outer jacket, on the outer surface of the outer jacket and in the markings. Afterwards the coarse brush roller removes most of the wax which is on the outer surface of the outer jacket leaving the wax which is in the markings and the fine brush roller removes the remainder of the wax which is on the outer surface of the outer jacket and polishes the outer surface.

11 Claims, 2 Drawing Sheets

LASER MARKING APPARATUS AND METHOD FOR PROVIDING MARKINGS OF ENHANCED READABILITY IN AN OUTER JACKET OF A MOVING CABLE

This application is a continuation of application Ser. No. 408,8181, filed on Sept. 18, 1989, now abandoned.

BACKGROUND OF THE INVENTION

2. Field of the Inventions

The present invention relates to a cable marking apparatus which uses a laser marker to provide markings, such as alphanumeric characters and symbols, in an outer jacket of a moving cable and more particularly to a cable marking apparatus which also includes an applicator to apply a wax and a wax remover to remove the wax and enhance the readability of the markings.

2. Description of the Prior Art

After a cable which has an outer jacket with an outer surface has been manufactured, a cable marking machine applies markings to the outer jacket at predetermined intervals on the outer surface of the outer jacket. These markings are coded and indicative of the type and size of the cable. There are many different cable marking machines which use embossers, printers or laser markers. There are advantages in using laser markers in cable marking machines because the laser markers can provide cable marking machines with a high speed output. However, cable marking machines have not been able to effectively and fully utilize the laser markers. This is due to certain limitations, such as the number of digits which are required, the frequency of the markings and the lengthy set-up time required to mark cables of different types and sizes.

U.S. Pat. No. 4,370,542, entitled Cable Marking Method and Apparatus, issued to John B. Mills and Christopher H. Roberts on Jan. 25, 1983, teaches a cable marking machine which includes a computer and a laser marker and which marks a cable. The computer is a preprogrammed microprocessor and controls the operation and positioning of the laser marker. The cable has an outer jacket of insulation and an inner jacket of insulation. The color of the outer jacket of insulation is different from and contrasts with the color of the inner jacket of insulation. The laser marker burns at predetermined intervals the outer jacket of insulation. The markings are rendered visible due to the contrasting colors of the inner jacket of insulation.

U.S. Pat. No. 4,808,966, entitled Laser-Markable Electric Cable, issued to Jean-Pierre Ferlier and Michel Marechal on Feb. 28, 1989, teaches an outer jacket and an inner jacket for use with a cable. The outer jacket is of a thickness in the range of 5 to 50 microns. The color of the inner jacket contrasts with the color of the outer jacket. A selected area of the outer jacket absorbs light energy from a laser marker during marking through its entire thickness and is completely vaporized so as to reveal the corresponding area of the inner jacket thereby rendering the markings visible. German Pat. No. 3,147,230 describes an outer jacket of a cable whose outer surface is initially sprayed with a colored coating which is of a specified color and which is baked using either radio-frequency energy or infra-red light energy. Light energy from a laser marker is subsequently used to selectively burn off the coating. The markings are rendered visible due to the contrasting colors of the outer jacket and the coating.

U.S. Pat. No. 4,720,618 and U.S. Pat. No. 4,727,235, both entitled Method and Apparatus for Equalizing Power Output in a Laser Marking System, issued to Michael E. Stamer and Stephen A. Kozich on Jan. 19, 1988 and Feb. 23, 1988, teach a laser marker which includes a computer, a monitor with a keyboard, a laser interface circuit, a direct current power supply, a plurality of radio frequency amplifiers and a laser head. The keyboard of the monitor permits the operator to communicate with the computer in order to enter data and alter the operation of the laser interface circuit. The laser marker inscribes a matrix of a plurality of dot-craters to form alphanumeric characters and symbols onto moving articles. The laser marker may be adapted to apply markings to a cable.

U.S. Pat. No. 4,652,722, entitled Laser Marking Apparatus, issued to Joseph J. Stone and Leroy V. Sutter, Jr. on Mar. 24, 1987, teaches a laser marker which includes a laser head which has a plurality of individual lasers each of which is dedicated to write a predetermined character row, mirrors and an exit lens. The laser marker writes columns in sequence as the article passes the laser head. The laser marker inscribes a matrix of a plurality of dot-craters to form alphanumeric characters and symbols onto moving articles. The matrix has a predetermined number of rows and columns which defines the alphanumeric characters and symbols. The laser marker may be adapted for use in a cable marking machine.

U.S. Pat. No. 3,434,456, entitled Machine for Circumferential Color Coding, issued to Chester J. Geating on Mar. 25, 1969, teaches a coding system which encodes an outer jacket of a cable. The coding system is operated by pulling the cable past successive marking stations which are phase displaced and in each of which is an ink carrier for marking the outer jacket. The coding system is a commercially available machine which applies footage and code marks to the outer jacket.

U.S. Pat. No. 4,579,759, entitled Inscribable Cable Marking Strip, issued to Manfred O. Breuers on Apr. 1, 1986, teaches a marking strip which is for use on an outer jacket of a cable. The marking strip includes a strip of an adhesive tape having a self-adhering bottom side and carrying an inscribable marking section. The beginning of the inscribable marking section is located at a distance from the adjacent front end of the adhesive tape to define an unlettered, transparent starting section of the strip which may be pressed onto the outer jacket without soiling the marking section or smudging the lettering applied to it.

U.S. Pat. No. 3,788,213, entitled Methods of and Apparatus for Marking Successive Sections of an Elongated Material, issued to William B. Brown, George Frank Besnyo and Eugene Marshall Hornor on Jan. 29, 1974, teaches an apparatus which applies a coding mark to successive sections of an outer jacket of a cable which are being advanced and in which the coding mark may be changed. The apparatus includes a first printer head and a second printer head. When the first printer head is in a printing alignment with the cable, it marks a code on the successive sections of the cable which is advanced in engagement therewith. When the second printer head is moved into printing alignment with the cable it marks a different code on successive sections of a subsequent cable which is of a different construction.

U.S. Pat. No. 2,739,528, entitled Wire Marking Apparatus, issued to James Lowe on Mar. 27, 1956, teaches a cable marking apparatus which includes a print wheel and a drive wheel which drives the print wheel independently of its contact with the cable, but at a peripheral velocity identical with the linear velocity of the cable. The drive wheel frictionally engages the cable at a point remote from the print wheel where the insulation is relatively hard and non-deformable. The print wheel prints on a cable which has an insulating coating and which is continuously moving. The print wheel lightly contacts the cable at a point where its insulating coating is still in a pliable and deformable state. Published German patent application number 1,465,840 also teaches a cable marking system.

U.S. Pat. No. 4,085,357, entitled Synchronous Switching Means for Operating Cable Marking Apparatus, issued to Chris Ansberg and Klaus Maisel on Apr. 18, 1978, teaches a cable marking machine which includes an uncoiler, a screw extruder and a marker, a cooling tube, a pull-off unit and a take-up reel. U.S. Pat. No. 3,552,308, entitled Synchronizing the Movement of First and Second Articles and Printing Markings on one of the Articles, issued to Robert F. Minehart on Jan. 5, 1971, teaches a cable marking machine which synchronizes the movement of an elongated jacketed cable and a rotatable print wheel. U.S. Pat. No. 2,867,001, entitled Means and Method for Forming Indicia on the Surface of Continuous Vulcanized Products, issued to Edward Lewis, Willis D. Rice and Edward Estrin on Jan. 6, 1959, teaches a cable marking machine. U.S. Pat. No. 3,551,542, entitled Marking Method for Electric Cable, issued to Rosario K. Perrone on Dec. 29, 1970, teaches a method of forming and vulcanizing markings on the surface of an elongated extrudate. U.S. Pat. No. 4,182,239, entitled Cable and Hose Marking Machine, issued to Michael D. Timmins and Larry L. Trepanier on Jan. 8, 1980, teaches a cable marking machine which imprints identifying markings in an outer jacket of a cable which is plastic covered. U.S. Pat. No. 3,711,757, entitled Automatic Servo System for Electric Cable Marking Machines, issued to Jean Baptiste Marie Reforzo on Jan. 16, 1973, teaches a cable marking machine which includes a cable run measuring mechanism, a cable cutting mechanism and an electronic unit which generates marking control signals which change the pitch of the marking.

SUMMARY OF THE INVENTION

In view of the foregoing factors and conditions which are characteristic of the prior art, it is the primary object of the present invention to provide a laser marking apparatus which includes a laser marker which inscribes markings in the outer jacket, which is of a specified color, of a moving cable opening to an outer surface thereof, an applicator which applies a wax, the color of which is different from and contrasts with specified color of the outer jacket, onto the outer surface of the outer jacket with some of the wax flowing into the markings and a coarse brush roller and a fine brush roller which remove only the wax which is on the outer surface of the outer jacket leaving the wax which is in the markings thereby enhancing readability thereof.

It is another object of the present invention to provide a laser marking apparatus which includes a laser marker, a computer and a monitor with a keyboard which an operator uses to communicate with the computer in order to enter data and alter the operation of the laser marker.

It is still another object of the present invention to provide a laser marking apparatus which fully utilizes the high speed capability of a laser marker without experiencing any of the limitations which are imposed by the number of digits which are required, the frequency of the markings, the need to provide markings in outer jackets of cables of different types and sizes and the set-up time which is required for changing from one type and size to another.

It is yet another object of the present invention to provide a laser marking apparatus for providing markings in the outer jacket, which is of a specified color, of a moving cable which includes a laser marker without the necessity of penetrating the entire thickness of the outer jacket in order to expose an inner jacket, the color of which would be different from and would contrast with the specified color of the outer jacket.

It is still yet another object of the present invention to provide a laser marking apparatus for providing markings in the outer jacket of a moving cable which eliminates any need of applying a coating, which is of a specified color, to the outer surface of the outer jacket and a laser marker which must penetrate the entire thickness of the coating in order to expose the outer jacket, the color which is different from and contrasts with the specified color of the coating.

In accordance with the present invention an embodiment of a laser marking apparatus for providing markings of enhanced readability in an outer jacket of repetitively spaced sections along the length of a moving cable is described. The cable is delivered from a supply source. The cable is advanced under tension and is wound onto a take-up spool. The outer jacket is of a specified color and has an outer surface. The laser marking apparatus includes a first guide roller, a laser marker, an applicator, a coarse brush roller with a first driving mechanism, a fine brush roller with a second driving mechanism and a second guide roller. The first and second guide rollers are disposed adjacent to the supply source before the laser marker and before the take-up spool after the fine brush roller, respectively, in order to guide the cable along a path of travel so that the outer jacket passes adjacent to the laser marker. The laser marker inscribes in the outer jacket markings opening to the outer surface thereof. The applicator applies a wax, the color of which is different from and contrasts with the specified color of the outer jacket, on the outer surface of the outer jacket and in the markings. Afterwards the coarse brush roller removes most of the wax which is on the outer surface of the outer jacket leaving the wax which is in the markings and the fine brush roller removes the remainder of the wax which is on the outer surface of the outer jacket and polishes the outer surface.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figures 1, 2:
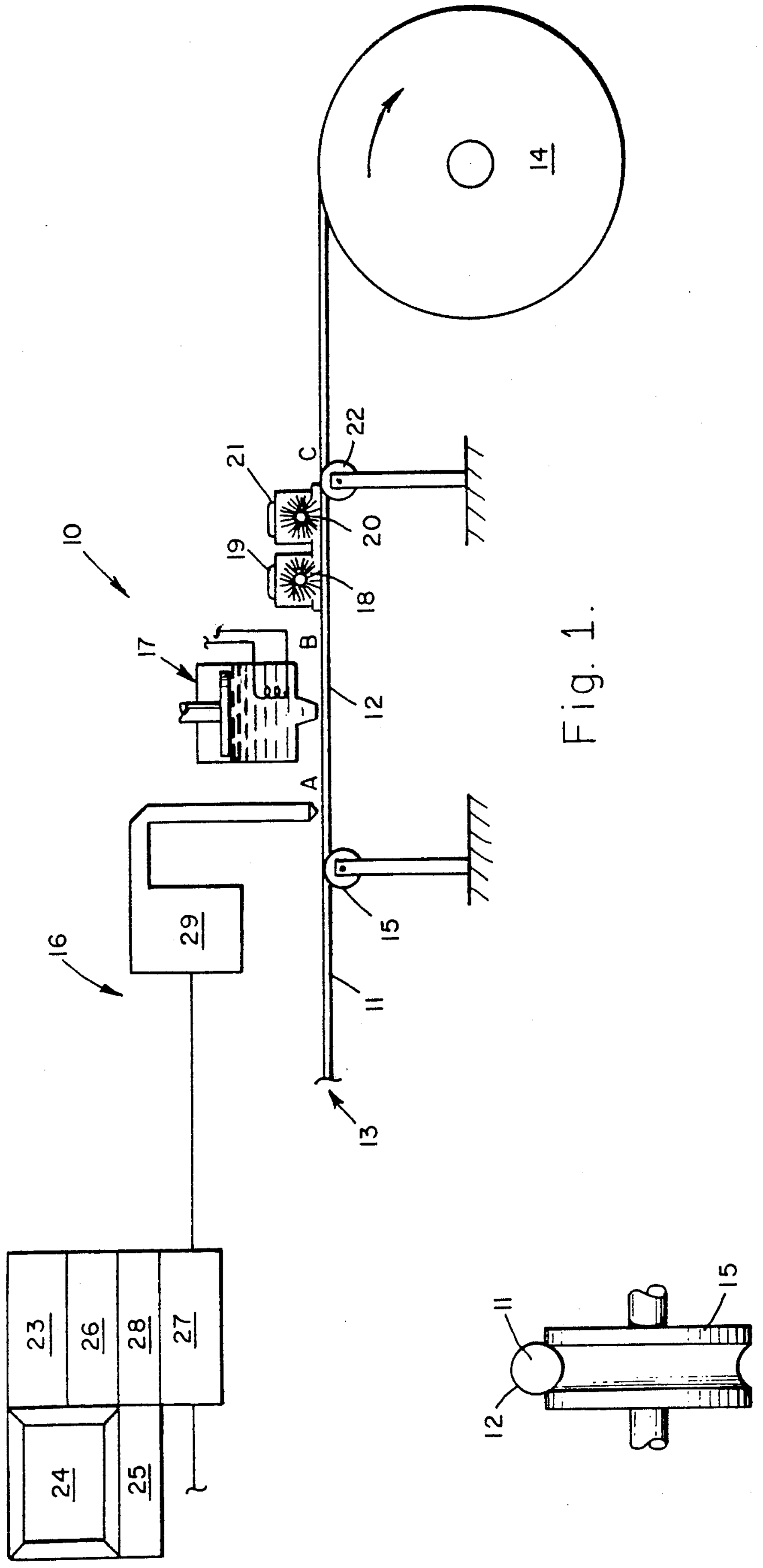
FIG. 1 is a schematic drawing of a laser marking apparatus which includes a laser marker, a wax applicator and a wax remover for providing in an outer jacket of a moving cable the five alphanumeric characters of the word "CABLE" of enhanced readability and which has been made in accordance with the principles od the present invention.
FIG. 2 is an end view of one of the guide rollers of the laser marking apparatus of FIG. 1.

In order to best understand the present invention it is necessary to refer to the following description of its preferred embodiment in conjunction with the accompanying drawing. Referring to FIG. 1 in conjunction with FIG. 2 a laser marking apparatus 10 inscribes markings, such as alphanumeric characters and symbols, in an outer jacket 12 of a moving cable 11 which is delivered from a supply source 13. The cable 11 is advanced under tension and is wound onto a take-up spool 14. The outer jacket 12 is formed out of a high-density polyethylene material and has an outer surface. The outer jacket 12 is of a specified color, generally black. The markings are provided repetitively in sections spaced along the length of the cable 11. The laser marking apparatus 10 includes a first guide roller 15, a laser marker 16, an applicator 17, a coarse brush roller 18 with a first driving mechanism 19, a fine brush roller 20 with a second driving mechanism 21 and a second guide roller 22. The first and second guide rollers 15 and 22 are disposed adjacent to the supply source 13 before the laser marker 16 and before the take-up spool 14 after the fine brush roller 20, respectively, in order to guide the cable 11 along a path of travel so that the outer jacket 12 passes adjacent to the laser marker 16. The first and second driving mechanisms 19 and 21 rotatively drive the coarse brush roller 18 and the fine brush roller 20, respectively. The laser marker 16 inscribes in the outer jacket 12 markings opening to the outer surface thereof. The applicator 17 applies a flowable material, typically either white or yellow, which is different from and contrasts with the specified color of the outer jacket 12, onto the outer surface of the outer jacket 12 and into the markings along each repetitively marked section of the cable 11. Afterwards the coarse brush roller 18 removes most of the wax which is on the outer surface of the outer jacket 12 leaving the flowable material which is in the markings and the fine brush roller 20 removes the remainder of the wax which is on the outer surface of the outer jacket 12 and polishes the outer surface thereof to enhance the readability of the markings.

U.S. Pat. No. 4,720,618 and U.S. Pat. No. 4,727,235 teach the laser marker 16 of FIG. 1 and hereby are incorporated by reference. The laser marker includes a computer 23, a monitor 24 with a keyboard 25, a laser interface circuit 26, a direct current power supply 27, seven radio frequency amplifiers 28 and a laser head 29 with a beam delivery tube and a lens. The laser head 29 includes seven carbon dioxide lasers which are excited by radio frequency energy at a frequency of 27 megahertz to a nominal power of 20 watts. The output beams of the seven lasers are directed through the beam delivery tube via mirror onto the lens which focuses the output beams onto a marking area. The output of the seven carbon dioxide lasers are focused by the lens to form a seven dot-high vertical column of beams. Since the outer jacket 12 of the cable to be marked moves transversely with respect to the vertical column it is possible to create a 7 by n dot matrix from which alphanumeric characters and symbols may be generated by selectively controlling the beam energy of each laser. The keyboard 25 of the monitor 24 permits the operator to communicate with the computer 23 in order to enter data and alter the operation of the laser interface circuit 26. The radio frequency energy for exciting the lasers is generated by the radio frequency amplifiers 28 which are located in a control console. There is one radio frequency amplifier 28 for each laser. The radio frequency amplifiers 28 are controlled by digital signals from the computer 23 via the laser interface circuit 26. Each laser is separately controllable by a signal which turns the laser on or off depending on the particular character to be printed.

Figure 3:
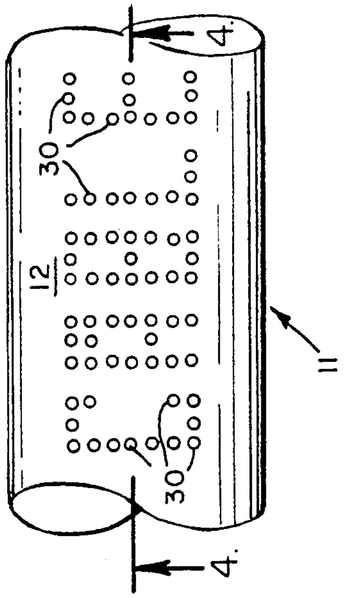
FIG. 3 a top plan view of a section of the outer jacket at point A after the laser marker of FIG. 1 has inscribed a plurality of dot-craters in the outer jacket opening to the outer surface thereof.
Figure 4:
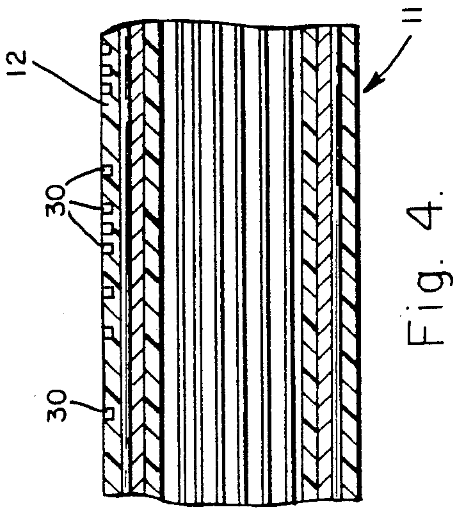
FIG. 4 is a longitudinal side view in cross-section of the section of the cable at point A taken along line 4—4 of FIG. 3.

Referring to FIG. 3 in conjunction with FIG. 1 and FIG. 4 the markings are a plurality of dot-craters 30 which are inscribed in the outer jacket 12 which open to the outer surface thereof. The dot-craters 30 are arranged in the form of an m by n matrix to generate either an alphanumeric character or a symbol. The depth of dot-craters 30 is in the range of 0.003 to 0.005 inches. The dot-craters 30 are arranged in a set of five seven by three matrices to form the five alpha characters of the word "CABLE." After the laser marker 16 has inscribed a plurality of dot-craters 30 in the outer jacket 12 a section of the cable 11 is at point A.

Figure 5:
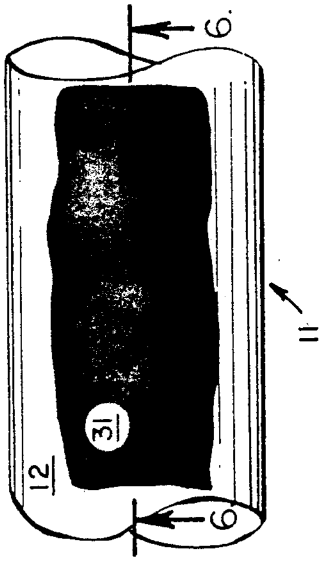
FIG. 5 is a top plan view of the same section of the cable at point B after the applicator of FIG. 1 has applied wax to the outer surface of the outer jacket and the dot-craters of the same section of the cable.
Figure 6:
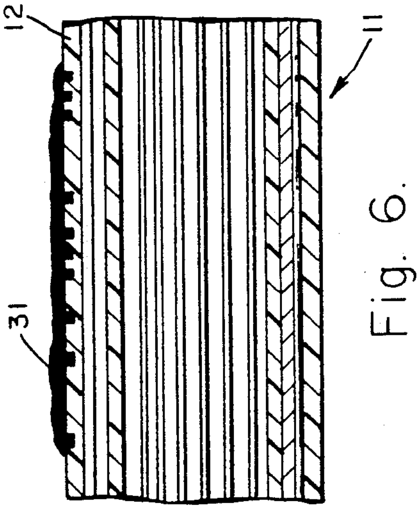
FIG. 6 is a longitudinal side view in cross-section of the same section of the cable at point B taken along line 6—6 of FIG. 5.

Referring to FIG. 5 in conjunction with FIG. 1 and FIG. 6 the flowable material is a wax 31, with a pigment, typically either white or yellow. The applicator 17 applies the wax 31 on the outer surface of the outer jacket 12 of the same section of the cable 11. The wax 31 covers the outer surface of the outer jacket 12 of the same section of the cable 11 and flows into each dot-crater 30 therein. The applicator 17 includes a container which contains the wax 31 and which has an outlet nozzle, a heater and pressurizing mechanism. The container is disposed adjacent to the path of travel of the cable 11 after the laser marker 16. The outlet nozzle is disposed adjacent and contiguous to the outer surface of the outer jacket 12. The heater heats the wax 31 and is disposed in and mechanically coupled to the container. The pressurizing mechanism is disposed in and mechanically coupled to the container and pressurizes the heated wax 31. The outlet nozzle discharges the pressurized and heated wax 31 onto the outer surface of the outer jacket 12. After the applicator 17 has applied the wax 31 onto the outer surface, the same section of the cable 11 is at point B. The wax 31 covers the outer surface of the outer jacket 12 of same section of the cable 11 and fills all of the dot-craters 30 therein. The wax 31 has a low melting point in that it melts at a temperature in the range of 80 to 100 degrees Centigrade. There is typically either a white pigment or a yellow pigment in the wax 31.

Figure 7:
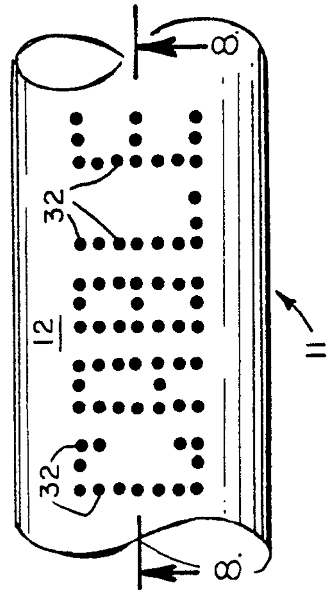
FIG. 7 is a top plan view of the same section of the cable at point C after the wax remover of FIG. 1 has removed only the wax which is on the outer surface of the outer jacket leaving the wax which is in the markings and has polished the outer surface thereof so that the wax which remains in each dot-crater enhances the readability of the inscribed markings.
Figure 8:
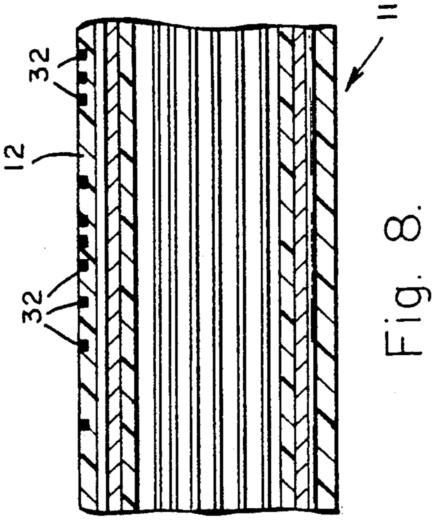
FIG. 8 is a longitudinal side view in cross-section of the same section of the cable at point C taken along line 8—8 of FIG. 7.

Referring to FIG. 7 in conjunction with FIG. 1 and FIG. 8 the same section of the cable 11 is at a wax remover which includes the coarse brush roller 18 and the fine brush roller 20. The coarse brush roller 18 is disposed adjacent to the path of travel of the cable 11 after the applicator 17. The coarse brush roller 18 is adjacent and contiguous to the outer surface of the outer jacket 12. The first driving mechanism 19 rotatively drives the coarse brush roller 18. The coarse brush roller 18 removes most of the applied wax 31 which is on the outer surface of the outer jacket 12. The fine brush roller 20 is disposed adjacent to the path of travel of the cable 11 after the coarse brush roller 18. The fine brush roller 20 is disposed adjacent and contiguous to the outer surface of the outer jacket 12. The second driving mechanism 21 rotatively drives the fine brush roller 20. The fine brush roller 20 removes the remainder of the wax 31 which is on the outer surface of the outer jacket 12 and polishes the outer surface thereof so that the wax 31 which is in each dot-crater 30 remains. After the fine brush roller 20 has polished the outer surface of the outer jacket 12 so that all of the dot-craters 30 remain filled with the wax 31, the same section of the cable 11 is at point C. Each wax-filled dot-crater 30 is rendered more visible due to the contrasting colors of the outer jacket 12, which is black, and the wax 31, which is either white or yellow, so that the readability of the alphanumeric characters and symbols 32 in the outer jacket 12 of the cable 11 is enhanced.

In alternative embodiments of the present invention other laser markers may be used to inscribes markings in the outer jacket 12 of the cable 11. The laser marker 16 of the preferred embodiment includes seven carbon dioxide lasers. U.S. Pat. 4,636,043, entitled Laser Beam Scanning Device and Marking System, issued to Dennis R. Bellar on Jan. 13, 1987, teaches another laser marker which utilizes a laser scanner to mark items. U.S. Pat. No. 4,024,545, entitled Laser-Excited Marking System, issued to Terence S. Bosling, Robert J. Dompe, Harry G. Heard and Keith K. Hazard on May 17, 1977, teaches yet another laser marker for inscribing markings, such as alphanumeric characters and symbols, in the outer surface layer of an article in accordance with predetermined information. Other lasers, including, but not being limited to, an argon laser, another carbon dioxide laser, a neodymium:YAG laser, an erbium:YAG laser, and an excimer laser, may be used in each of these laser marker so long as the laser marker is able to inscribe markings in the material which forms the outer jacket 12 of the cable 11.

From the foregoing it can be seen that a laser marking apparatus which provides in an outer jacket of a moving cable markings, such as alphanumeric characters and symbols of enhanced readability has been described.

It should be noted that the sketches are not drawn to scale and that distance of and between the figures are not to be considered significant.

What is claimed is:

1. A laser marking apparatus for providing markings in an outer jacket of a moving cable wherein the outer jacket, which is of a specified color, has an outer surface and the cable, which is delivered from a supply source, is advanced under tension and is wound onto a take-up spool, said laser marking apparatus comprising:

a. laser marking means for inscribing markings in the outer jacket opening to the outer surface thereof;

b. guiding means for guiding the cable along a path of travel so that the cable passes said laser marking means adjacent thereto, said guiding means being disposed adjacent to said path of travel between the supply source and the take-up spool;

c. applicating means for applying a flowable material, the color of which is different from and contrasts with the specified color of the outer jacket, onto the outer surface of the outer jacket so that some of said flowable material flows into each of said markings; and d. removing means for removing only the portion of said flowable material which is on outer surface of the outer jacket and leaving the reminder of said flowable material which is in each of said markings whereby the readability of said markings is enhanced.

2. A laser marking apparatus for providing markings in an outer jacket of a moving cable according to claim 1 wherein said laser marking means inscribes a plurality of dot-craters in the outer surface of the cable with said dot-craters being arranged in the form of an m by n matrix to generate alphanumeric characters and symbols.

3. A laser marking apparatus for providing markings in an outer jacket of a moving cable according to claim 2 wherein said applicating means applies a wax onto the outer surface of the outer jacket so that said wax flows into each of said dot-craters.

4. A laser marking apparatus for providing markings in an outer jacket of a moving cable according to claim 3 wherein said laser marking means comprises:

a. a laser head which includes a plurality of carbon dioxide lasers;

b. a beam delivery tube which is optically and mechanically coupled to said laser head; and c. a lens which is optically and mechanically coupled to said beam delivery tube.

5. A laser marking apparatus for providing markings in an outer jacket of a moving cable according to claim 3 wherein said guiding means comprises:

a. a first guide roller which is disposed adjacent to the supply source and adjacent to said path of travel of the cable before said laser marking means; and b. a second guide roller which is disposed adjacent to said path of travel of the cable after said laser marking means and adjacent to the take-up spool whereby said first and second guide rollers guide the cable past said laser marking means.

6. A laser marking apparatus for providing markings in an outer jacket of a moving cable according to claim 3 wherein said applicating means comprises:

a. a container which contains wax and which has an outlet nozzle, said container being disposed adjacent to said path of travel of the cable after said laser marking means and said outlet nozzle being disposed adjacent and contiguous to the outer jacket;

b. heating means for heating said wax, said heating means being disposed in and mechanically coupled to said container; and c. pressurizing means for pressurizing said heated wax, said pressurizing means being disposed in and mechanically coupled to said container whereby said outlet nozzle discharges said pressurized and heated wax onto the outer surface of the cable.

7. A laser marking apparatus for providing markings in an outer jacket of a moving cable according to claim 3 wherein said removing means comprises:

a. a coarse brush roller which is disposed adjacent to said path of travel of the cable after said applicating means, said coarse brush roller being adjacent and contiguous to the outer jacket of the cable;

b. first driving means for rotatively driving said coarse brush roller whereby said coarse brush roller removes most of said applied wax which is on the outer surface of the outer jacket;

c. a fine brush roller which is disposed adjacent to said path of travel of the cable after said coarse brush roller, said fine brush roller being disposed adjacent and contiguous to the outer surface of the outer jacket; and d. second driving means for rotatively driving said fine brush roller whereby said fine brush roller the remainder of said applied which is on the outer surface of the outer jacket and polishes the outer surface.

8. A method for providing markings in an outer jacket of a moving cable wherein the outer jacket, which is of a specified color, has an outer surface and the cable, which is delivered from a supply source, is advanced under tension and is wound onto a take-up spool, said method comprising the steps of:

a. using a laser to inscribe markings in the outer surface of the outer jacket of a section of the cable;

applying a flowable material, the color of which is different from and contrasts with the specified color of the outer jacket, onto the outer surface of the outer jacket of the section of the cable so that said flowable material covers the outer surface and flows into each of said markings; and c. only removing said flowable material which is on the outer surface of the outer jacket and allowing to remain said flowable material which is in each of said markings whereby the readability of said markings is enhanced.

9. A method for providing markings in an outer jacket of a moving cable according to claim 8 wherein said laser marker inscribes a plurality of dot-craters in the outer jacket with said dot-craters being arranged in the form of an m by n matrix to generate alphanumeric characters and symbols.

10. A method for providing markings in a moving cable according to claim 9 wherein the flowable material is a wax and wherein the step of applying said wax comprises the steps of:

a. heating said wax;

b. pressurizing said heated wax; and c. discharging said heated and pressurized wax through an outlet nozzle onto the outer surface of the outer jacket.

11. A method for providing markings in a moving cable according to claim 10 wherein the step of removing said wax comprises the steps of:

a. using a coarse brush roller to removes most of said applied wax from the outer surface of the outer jacket of the section of the cable; and b. using a fine brush roller to remove the remainder of said applied wax which is on the outer surface of the outer jacket and polish the outer surface.

* * * * *